United States Patent
Alford et al.

(10) Patent No.: US 6,803,132 B1
(45) Date of Patent: Oct. 12, 2004

(54) TEMPERATURE STABILIZATION OF DIELECTRIC RESONATOR

(75) Inventors: Neil McNeil Alford, London (GB); Stuart James Penn, Wickford (GB); Jonathan Breeze, London (GB)

(73) Assignee: South Bank University Enterprises Ltd., London (GB)

( * ) Notice: Subject to any disclaimer, the term of this patent is extended or adjusted under 35 U.S.C. 154(b) by 0 days.

(21) Appl. No.: 10/149,355

(22) PCT Filed: Nov. 20, 2000

(86) PCT No.: PCT/GB00/04399

§ 371 (c)(1),
(2), (4) Date: Jun. 7, 2002

(87) PCT Pub. No.: WO01/42167

PCT Pub. Date: Jun. 14, 2001

(30) Foreign Application Priority Data

Dec. 7, 1999 (GB) .............................................. 9928865

(51) Int. Cl.[7] .............................. B32B 9/04; H01P 7/10
(52) U.S. Cl. ...................... 428/697; 428/701; 428/702; 333/219.1
(58) Field of Search ................................ 428/701, 702, 428/697; 333/219.1

(56) References Cited

U.S. PATENT DOCUMENTS

| | | | | |
|---|---|---|---|---|
| 4,504,522 A | * | 3/1985 | Kaiser et al. ................ | 427/103 |
| 6,037,289 A | | 3/2000 | Chopin et al. ................. | 502/2 |
| 6,610,623 B1 | * | 8/2003 | Alford et al. ................ | 501/153 |

FOREIGN PATENT DOCUMENTS

| | | | |
|---|---|---|---|
| FR | 2738836 A | 3/1997 | |
| JP | 09071418 A | * 3/1997 | ......... C01G/23/053 |

OTHER PUBLICATIONS

Chemical Abstracts, vol. 112, No. 22, May 28, 1990, Columbus, Ohio, U.S.; Abstract No. 202503V, C.S. Hwang, et al.: p. 310 XP000153474.

K. Kato: "Photocatalytin Property of T1O2 Anchored on Porous Alumina Ceramic Support by the Alkoxide Method", Journal of the Ceramic Society of Japan—International Edition vol. 101, No. 3, Mar. 1993, pp. 240–244 XP000381418.

Database WPI, Week 199721, Derwent Publications Ltd., London, GB; AN 1997–231057, XP002165371 & JP 09 071418 A (Sagaken), Abstract.

Database WPI, Week 199332, Derwent Publications Ltd., London, GB; AN 1993–253904, XP002165372.

Patent Abstracts of Japan, vol. 014, No. 140 (M–0950), Mar. 16, 1999, & JP 02 006154 A (OKI Electric Ind Co), Abstract.

Chemical Abstracts, vol. 121, No. 2, Jul. 11, 1994, Columbus, Ohio, US, Abstract No. 1584LR, S.H. Hyun, et, al.: p. 434 XP000494158.

* cited by examiner

*Primary Examiner*—Stephen Stein
(74) *Attorney, Agent, or Firm*—Bartlett & Sherer; Ronald B. Sherer

(57) ABSTRACT

A dielectric resonator having a first layer of alumina and a second layer of $TiO_2$ is disclosed which has a superior combination of properties such as low dielectric loss, low temperature coefficient and high thermal conductivity.

5 Claims, No Drawings

TEMPERATURE STABILIZATION OF DIELECTRIC RESONATOR

This is a 371 application of PCT/GB00/04399 filed Nov. 20, 2000.

The present invention relates to a temperature stabilised ceramic material which has low dielectric loss and high thermal conductivity.

In current microwave communication technology dielectric resonators (DRs) are key elements for filters, low phase noise oscillators and frequency standards. DRs possess resonator quality factors (Q) comparable to cavity resonators, strong linearity at high power levels, can possess low temperature coefficients, high mechanical stability and small size.

Ceramic dielectric materials are used to form DRs as key components in a number of microwave subsystems which are used in a range of consumer and commercial market products. These products range from Satellite TV receiver modules (frequency converter for Low Noise Broadcast (LNB)), Cellular Telephones, PCN'S. (Personal Communication Networks Systems) and VSAT (Very Small Aperture Satellite) systems for commercial application to emerging uses in transportation and automobile projects, such as sensors in traffic management schemes and vehicle anti-collision devices. Dielectric Resonators may be used to determine and stabilise the frequency of a microwave oscillator or as a resonant element in a microwave filter. New systems of satellite TV transmission based on digital encoding and compression of the video signals determine the need for improved DR components. The availability of advanced materials will also enable necessary advances in the performance of DRs used for other purposes as referred to above.

A review on dielectric resonators and materials is given by Wersing in "High Frequency Ceramic Dielectrics and their Application For Microwave Components" in "Electronic Ceramics" Ed BCH Steele Elsevier 67–119.

There are three key properties for a dielectric resonator. The first is the dielectric loss, or $\tan\delta$. The Q of the resonator (which in the absence of other losses may be approximated to $1/\tan\delta$) determines the steepness of the filter skirts, the power requirements and the selectivity. The second is the dielectric constant ($\epsilon_r$). This determines the size of the resonator. Finally, the TCf, the temperature coefficient of the resonant frequency must be as near zero as possible. For high power filters it is very desirable for the dielectric to possess a high thermal conductivity, preferably greater than 20 W/m.K.

A ceramic material for use in dielectric resonators should have a low dielectric loss (high Q), a high dielectric constant, a TCf near zero and a high thermal conductivity.

However it is difficult to obtain a material with all these properties and in Table 1 below the properties of polycrystalline dielectric materials are given

TABLE 1

| Material | $\epsilon_r$ | TCf ppm/K | Q | f (GHz) | Thermal Conductivity W/mK |
|---|---|---|---|---|---|
| $Al_2O_3$ | 9 | 40 | 50,000 | 9.2 | >20 |
| Ba $(Mg_{1/3}Ta_{2/3})O_3$ | 24 | 0 | 26,000 | 10 | <4 |
| Ba—Zn—Ta—O | 30 | −3 . . . 3 | 12,000 | 6 | <4 |
| Zr—Sn—Ti—O | 38 | −3 . . . +3 | 8000 | 7 | <4 |
| Ca—Nd—Ti—Al—O | 43 | 0 | 4,700 | 10 | <4 |
| $TiO_2$ | 100 | 450 | 17,000 | 3 | <4 |
| $SrTiO_3$ | 270 | 1200 | 400 | 2 | <4 |

The Ca—Nd—Ti—O material is disclosed in U.S. Pat. 5,356,844.

The materials which are currently used as DR materials are those with TCf close to zero. In order to achieve low TCf in dielectric resonator materials the chemical composition of the material is altered. In most temperature stabilised ceramic compositions, the ceramic composition is substantially single phase e.g. Barium magnesium tantalate, barium zinc tantalate or zirconium tin titanate which are listed in Table 1. Whilst this is a very desirable approach, it is often the case that altering the chemical composition in order to achieve temperature stability causes a degradation in either the Q or the dielectric constant or both. Additionally, altering the chemical composition usually means that a second phase may be formed with undesirable TCf. For example, $TiO_2$ in combination with Ba forms $Ba_2TiO_9$ which has an acceptable TCf of only 2 ppm/K' but an inferior dielectric constant of 40 and a Q of 15,000 at 2 GHz. There are certain ceramic composites in which there exist two separate phases of opposite TCf. For example $Bi_2O_3$—$TiO_2$ composites in which a $Bi_2O_{11}$ phase is formed which possesses a TCf of −533 ppm/K, in opposition to the $TiO_2$ phase which possesses a TCf of +450 ppm/K. However, the Q factor is rather poor at Q=1800 at 5 GHz and with a TCf of 21 ppm/K.

In general it is well known that ceramic materials possess very poor thermal conductivity. Notable exceptions are beryllium oxide 270 W/mK, silicon carbide 67 W/m.K, aluminium nitride 15 W/m.K. However, none of these materials possesses particularly low dielectric loss.

Another approach is to use a composite dielectric resonator with improved frequency stability using two different zirconate materials with opposite TCf characteristics. A disadvantage of these materials is that the thermal conductivity of the zirconate materials is less than 4 W/m.K. Temperature compensated whispering gallery mode resonators have been examined for use at cryogenic temperatures. These use a single crystal sapphire disc and sandwiched the sapphire with thin rutile or strontium titanate plates. In the case of rutile plates, high Q and temperature stability was achieved at temperatures between 50–160K. The use of strontium titanate plates, although achieving temperature compensation, considerably reduced the Q of the composite due to the high dielectric loss of the strontium titanate. The problems with this approach are the cost of the single crystals and the fact that attaching the single crystals effectively is not trivial.

Other attempts to obtain dielectric materials with improved properties are disclosed in U.S. Pat. Nos. 391,672, 3,798,578, 4,580,116, 562,556 and 5,909,160.

Aluminium oxide is a well known ceramic dielectric material and has a room temperature dielectric constant of approximately 10 and previous works has shown that extremely low $\tan\delta$ can be achieved ($\tan\delta=2\times10^{-5}$, 300K 10 GHZ). The thermal conductivity of alumina is moderately high around 20–30 W/m.K at room temperature and this is a great advantage in high power filters operating at around 100 W.

Alumina has a TCf of −60 ppm/K and it would be highly desirable to be able to tune the TCf while maintaining a low $\tan\delta$.

We have now devised an alumina based ceramic material with good TCf and low tanδ.

According to the invention there is provided a ceramic composition which comprises an alumina sintered body on which there is a layer of titanium dioxide.

In this specification ceramic means any solid inorganic particulate material, the particles of which can be caused to sinter together by the application of heat.

The alumina is preferably doped with from to 0.05 to 0.5 wt. % of the titanium dioxide and more preferably with from 0.01 to 1.0 wt. % of the titanium dioxide. The compositions of the present invention can be made by mixing alumina powder with titanium dioxide powder and compressing and sintering the mixed powder using titanium dioxide powder and compressing and sintering the mixed powder using conventional methods to obtain a doped alumina ceramic material. It is not a requirement for the present invention that the alumina ceramic be doped with TiO2. The alumina sintered body or in the preferred form, the Ti doped alumina body will hereinafter be referred to as alumina in order to avoid confusion.

The alumina should contain the minimum of impurities as impurities can adversely affect the dielectric properties of the alumina.

The layer of the titanium dioxide preferably comprises a volume fraction between 0.0001 to 0.5 and more preferably between 0.001 to 0.05.

The alumina and titanium dioxide layer should be in intimate contact and preferably they are attached by solid state diffusion.

The titanium oxide layer can be formed on the alumina by forming a paste of the titanium dioxide and applying the paste to the alumina, drying and heating to form a dense layer of titanium dioxide on the doped alumina.

The paste of the titanium dioxide is preferably made with non-aqueous liquids such as polymers and non-aqueous solvents, the nature of the liquid is not critical.

The temperature of heating should be sufficient to densify the titanium dioxide and for example is preferably at least 1000° C.

The invention also provides a layered composite dielectric in which the two compositions, the alumina and the titanium dioxide layer, are attached by solid state diffusion and which has a very high Q a high thermal conductivity and a low temperature coefficient of the resonant frequency over a very wide temperature range.

The invention is described in the following Examples in which high purity alumina powder was doped with TiO2 at the 0.2 wt. level. (as described above, doping with TiO2 has been demonstrated to reduce the dielectric loss in sintered alumina considerably but it is not a necessity if a suitably high Q can be obtained in the alumina without doping with TiO2.) The powder was pressed at 100 MPa in a 13 mm stainless steel die set. The discs were sintered in air in a muffle furnace at a ramp rate of 5° C.min$^{-1}$ to 1600° C., dwell for 1 hour and 10° C.min$^{-1}$ to room temperature. The discs were weighed. The unloaded Q of 27 samples was determined at a frequency of approximately 10 GHZ and found to be Q=54,772, 1 standard deviation=2714, coefficient of variation=4.9%.

A thick film paste of TiO2 was prepared with high purity TiO2 powder. The powder was thoroughly mixed with a vehicle comprising non-aqueous polymers and solvents on a Marchant 3 roll mill. A special jig was designed in which different thickness of shim ranging from 100 μm to 300 μm could be placed on top of the sintered alumina disc. This enabled the manufacture of a range of depths for the TiO2 coating. The thick film paste was applied on to the surface of the alumina disc. The paste was dried at 80° C. and then the composite was fired at 1400° C. for 1 hour. This was sufficient to densify the TiO2. The result was a dense TiO2 layer on a dense alumina disc. The composite disc was then weighed and the weight of TiO2 was determined by difference. The volume fraction of the TiO2 and Al2O3 was determined by noting that the density for Al2O3 is 3.9/Mg m$^{-3}$ and that for TiO2 is 4.26 Mg m$^{-3}$.

The unloaded Q was measured at approximately 10 GHz by a resonant cavity method using the $TE_{01\delta}$ mode. The sample was placed in an oxygen-free high conductivity copper cavity on a 4 mm high low loss quartz spacer. The cavity was 30 mm in diameter, with adjustable height. The surface resistance of the copper was calculated from the Q of the $TE_{011}$ resonance of the empty cavity to allow the results to be corrected for the loss due to the cavity walls. The $TE_{01\delta}$ and mode was examined using a vector network analyser (Hewlett Packard HP8720C) with 1 Hz resolution. Particular care was taken to ensure that the samples were dry. On removal from the furnace, samples were placed in a vacuum desiccator over silica gel, using plastic tweezers to minimise surface contamination; when cool, samples were placed in the microwave cavity for measurement.

The TCf measurements were performed over a temperature range of 150K–320K. The sample was placed on the floor of a copper cavity identical to that described above but without a quartz spacer. Cooling and heating the cavity was achieved by placing the cavity on the cold-head of a closed cycle Gifford McMahon two stage cryocooler (CTI) capable of a temperature range 320K–10K.

The results are shown below, The turning point temperature Tp is defined as that temperature where the TCf is zero

EXAMPLE 1

The volume fraction of TiO2 was determined to be 0.0042 which resulted in a composite with a Tp of 134K and a Q of 41,000 at room temperature.

EXAMPLE 2

The procedure in example 1 was repeated except that the volume fraction of TiO2 was 0.0086 which resulted in a composite with a Tp of 203K and a Q of 34,100 at 300K

EXAMPLE 3

The procedure in example 1 was repeated except that the volume fraction of TiO2 was 0.0093 which resulted in a composite with a Tp of 200 and a Q of 34,800 at 300K

EXAMPLE 4

The procedure in example 1 was repeated except that the volume fraction of TiO2 was 0.0115 which resulted in a composite with a Tp of 245K and a Q of 31,400 at 300K

EXAMPLE 5

The procedure in example 1 was repeated except that the volume fraction of TiO2 was 0.0116 which resulted in a composite with a Tp of 250K and a Q of 31,800 at 300K

EXAMPLE 6

The procedure in example 1 was repeated except that the volume fraction of TiO2 was 0.012 which resulted in a composite with a Tp of 272K and a Q of 30,000 at 300K

EXAMPLE 7

The procedure in example 1 was repeated except that the volume fraction of TiO2 was 0.012 which resulted in a composite with a Tp of 265K and a Q of 32,200 at 300K

EXAMPLE 8

The procedure in example 1 was repeated except that the volume fraction of TiO2 was 0.0128 which resulted in a composite with a Tp 298K of and a Q of 28,200 at 300K

EXAMPLE 9

The procedure in example 1 was repeated except that the volume fraction of TiO2 was 0.0135 which resulted in a composite with a Tp of 286K and a Q of 29,100 at 300K

EXAMPLE 10

The procedure in example 1 was repeated except that the volume fraction of TiO2 was 0.017 which resulted in a composite with a Tp of 364 and a Q of 24,100 at 300K

EXAMPLE 11

The procedure in example 1 was repeated except that the volume fraction of TiO2 was 0.0225 which resulted in a composite with a Tp of 384K and a Q of 26,600 at 300K The results are summarised in Table 2

TABLE 2

| EXAMPLE No. | Sample no | Volume fraction TiO2 | Tp (K) | Q at 300K | TCf 300K |
|---|---|---|---|---|---|
| 1 | 1402D | .0042 | 134 | 41,100 | −44.4 |
| 2 | 1403D | .0086 | 203 | 34,100 | −23.4 |
| 3 | 1401D | .0093 | 200 | 34,800 | −20.2 |
| 4 | 1401E | .0115 | 245 | 31,400 | −10.5 |
| 5 | 1401G | .0116 | 250 | 31,800 | −10.0 |
| 6 | 1403E | .012 | 272 | 30,000 | −8.2 |
| 7 | 1402F | .012 | 265 | 32,200 | −8.2 |
| 8 | 1401F | .0128 | 298 | 28,200 | −4.8 |
| 9 | 1402E | .0135 | 286 | 29,100 | −1.8 |
| 10 | 1403F | .017 | 364 | 24,100 | 12.5 |
| 11 | 1402C | .0225 | 384 | 26,600 | 33.7 |

What is claimed is:

1. A dielectric resonator having a low dielectric loss (Q), a high dielectric constant, a low temperature coefficient (TCF) and high thermal conductivity comprising an alumina support layer and a titanium dioxide layer bonded together by solid state diffusion, and wherein said alumina support layer is doped with titanium dioxide.

2. The dielectric resonator of claim 1 wherein the Q value is in the range of 24,000 to 30,000 at 300K, and the TCF is in the range of 12.5 to minus 8.2 at 300K.

3. The dielectric resonator of claim 1 wherein the Q value is 29,000 or greater, and the TCF is less than 2.

4. The dielectric resonator of claim 1 in which said layer of titanium dioxide comprises a volume fraction between 0.001 to 0.05.

5. The dielectric resonator of claim 1 wherein said layer of titanium dioxide comprises a volume fraction greater than 0.012.

* * * * *